(12) United States Patent
Dobmeier et al.

(10) Patent No.: US 7,073,779 B1
(45) Date of Patent: Jul. 11, 2006

(54) WINCH ASSEMBLY

(75) Inventors: Ludwig Dobmeier, Windsor (CA); Paul Tindall, Windsor (CA)

(73) Assignee: Thyssenkrupp Fabco Corporation, Windsor (CA)

( * ) Notice: Subject to any disclaimer, the term of this patent is extended or adjusted under 35 U.S.C. 154(b) by 0 days.

(21) Appl. No.: 10/917,166

(22) Filed: Aug. 12, 2004

(51) Int. Cl.
*B65D 1/00* (2006.01)

(52) U.S. Cl. ............... 254/323; 414/466; 224/42.2; 224/42.23; 224/42.24

(58) Field of Classification Search ............... 254/323; 414/463, 466; 224/42.12, 42.2, 42.23, 42.24
See application file for complete search history.

(56) References Cited

U.S. PATENT DOCUMENTS

| 4,228,488 A * | 10/1980 | Garchinsky ............... 362/250 |
| 5,188,341 A * | 2/1993 | Greaves ..................... 254/323 |
| 5,314,288 A | 5/1994 | Schmidt ..................... 414/463 |
| 5,368,280 A * | 11/1994 | Ng .............................. 254/376 |
| 5,524,870 A | 6/1996 | Tallent et al. ............... 254/365 |
| 6,092,790 A * | 7/2000 | Dobmeier et al. .......... 254/323 |
| 6,132,162 A | 10/2000 | Kito et al. ................... 414/463 |
| 6,293,522 B1 * | 9/2001 | Dobmeier et al. .......... 254/323 |
| 6,390,452 B1 * | 5/2002 | Dobmeier et al. .......... 254/323 |
| 6,499,724 B1 | 12/2002 | Dobmeier et al. .......... 254/323 |
| 6,554,253 B1 | 4/2003 | Dobmeier et al. .......... 254/323 |

* cited by examiner

*Primary Examiner*—Emmanuel M Marcelo
(74) *Attorney, Agent, or Firm*—Gifford, Krass, Groh, Sprinkle, Anderson & Citkowski, P.C.

(57) ABSTRACT

A winch assembly is provided for use with a tire carrier having a mounting plate. The winch assembly includes a spool, a torque limiter and a housing. The housing has a closed end and an open end. The open end is adapted to be fixedly secured to the mounting plate to define a single cavity between the closed end and the mounting plate for substantially enclosing both the spool and the torque limiter therein.

14 Claims, 4 Drawing Sheets

WINCH ASSEMBLY

BACKGROUND OF THE INVENTION

1. Field of the Invention

The invention relates to a tire carrying device for raising and lowering a wheel between a storage position and an access position. More specifically, the invention relates to a winch assembly of the tire carrying device.

2. Description of the Related Art

Tire carrying devices are commonly used in automotive vehicles for raising and lowering a tire between a storage position disposed against an underside of the vehicle and an access position spaced apart from the underside of the vehicle to facilitate access to the tire. A tire carrying device usually includes a winch assembly that includes a spool, a flexible tether wrapped around the spool and having a free end attached to the tire, and a torque limiter operatively coupled to the spool to prevent overloading of the cable during raising of the tire to the storage position.

An example of a tire carrying device is disclosed in U.S. Pat. No. 6,554,253 ("the '253 reference") issued to Dobmeier et al. on Apr. 29, 2003. The '253 reference discloses first and second chambers or housings for separately enclosing the spool and torque limiter, respectively. Another tire carrying device is disclosed in U.S. Pat. No. 5,524,870 issued to Tallent et al. on Jun. 11, 1996. The Tallent reference discloses first and second housing components for separately housing the clutch and spool, respectively.

It remains desirable to provide a winch assembly for a tire carrying device that is less expensive and easier to manufacture than previously known tire carrying devices.

SUMMARY OF THE INVENTION

According to one aspect of the invention, a winch assembly is provided for use with a tire carrier having a mounting plate. The winch assembly includes a spool, a torque limiter and a housing. The housing has a closed end and an open end. The open end is adapted to be fixedly secured to the mounting plate to define a single cavity between the closed end and the mounting plate for substantially enclosing both the spool and the torque limiter therein.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
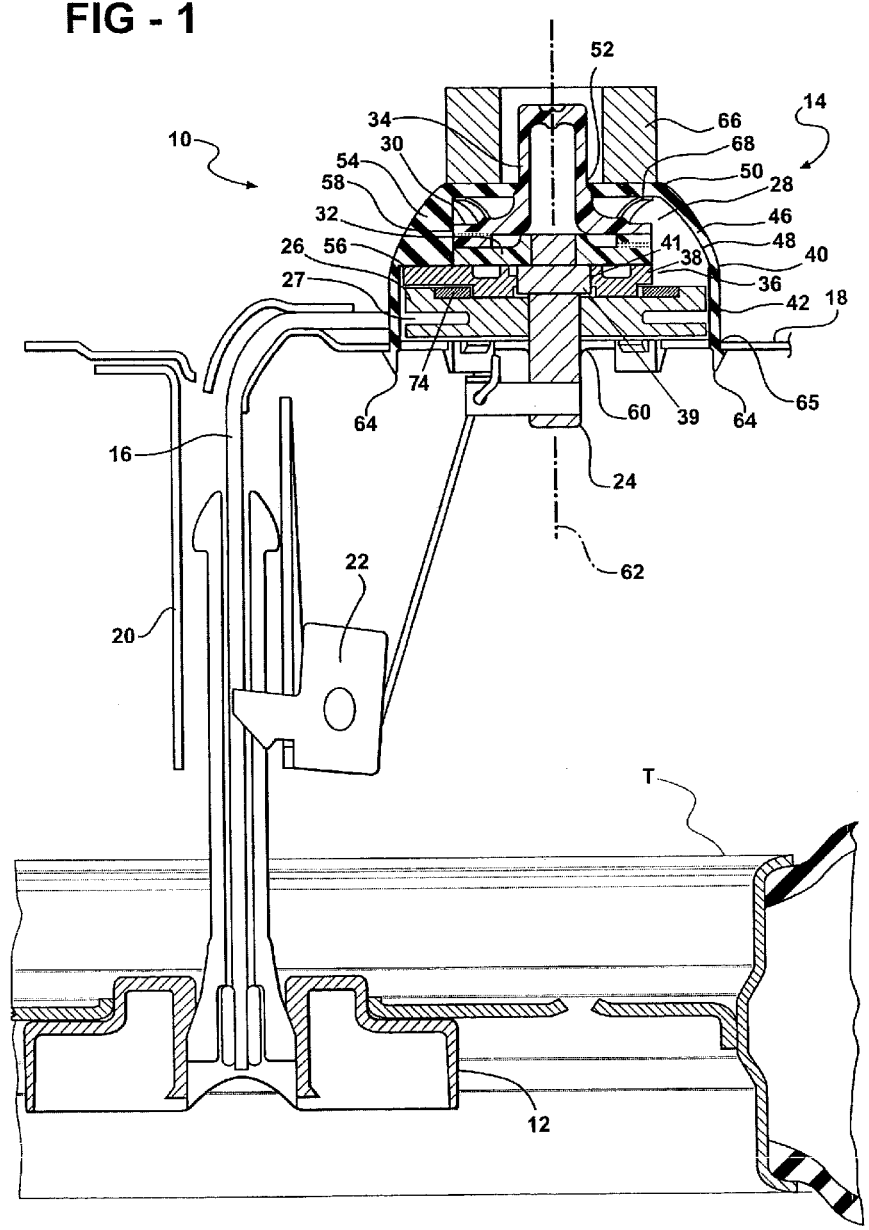
FIG. 1 is a cross sectional view of a tire carrying device according to the invention.

A tire carrying device 10 for carrying a spare tire T of a vehicle is shown in FIG. 1. The tire carrying device 10 includes a tire carrier 12 which is connected to a winch assembly 14 by a tether or cable 16. Preferably, the tire carrier 12 is a two-part carrier. The winch assembly 14 is operable to raise and lower the tire carrier 12 and tire T. The winch assembly 14 includes a mounting plate 18 which has a receiver tube 20 extending from a lower side of the mounting plate 18 to receive a top portion of the tire carrier 12. A latch 22 is mounted to the receiver tube to engage a top portion of the tire carrier to support the tire carrier in the event the cable separates. The tire carrier 12 and latch 22 may be of any suitable type known by those skilled in the art. Examples of the tire carrier 12 and the latch 22 are shown in U.S. Pat. No. 6,554,253 issued to Dobmeier et al. on Apr. 29, 2003, which is incorporated herein by reference in its entirety. A winch housing 40 according to the invention is mounted to an upper side of the mounting plate 18.

The winch assembly 14 includes a shaft 24 and a sheave or spool 26. The spool 26 is rotatably coupled to the shaft 24 and housing 40. The spool 26 includes a slot or groove 27 formed around the periphery for receiving the cable 16 as the tire carrier 12 is raised. The cable 16 extends between a fixed end fixedly secured to the spool 26 and a free end fixedly secured to the carrier 12. Described in greater detail below, a generally rigid sleeve or end fitting is fixedly secured to the fixed end of the cable 16. In turn, the end fitting is pivotally coupled to the spool 26 at the bottom of the groove 27.

A torque limiter 28 is operatively coupled to the shaft 24 to prevent overloading of the cable 16. More specifically, the torque limiter 28 includes a pair of friction plates 30, 32. An upper friction plate 30 extends from a drive nut portion 34 adapted to interconnect with a crank handle. A lower friction plate 32 is drivingly connected to the spool 26 via a gear reduction mechanism 36, preferably a taumel-type arrangement. Specifically, the lower friction plate 32 is coupled to the shaft 24 for rotation therewith. A biasing member 68, preferably a belleville spring, is continuously energized between the housing 40 and the torque limiter 28 for axially compressing the friction plates 30, 32 together. The biasing member 68 has a predetermined spring rate, such that beyond a predetermined level of torque, the upper 30 and lower 32 friction plates will slip relative to each other to prevent overloading of the cable 16.

Figure 6:
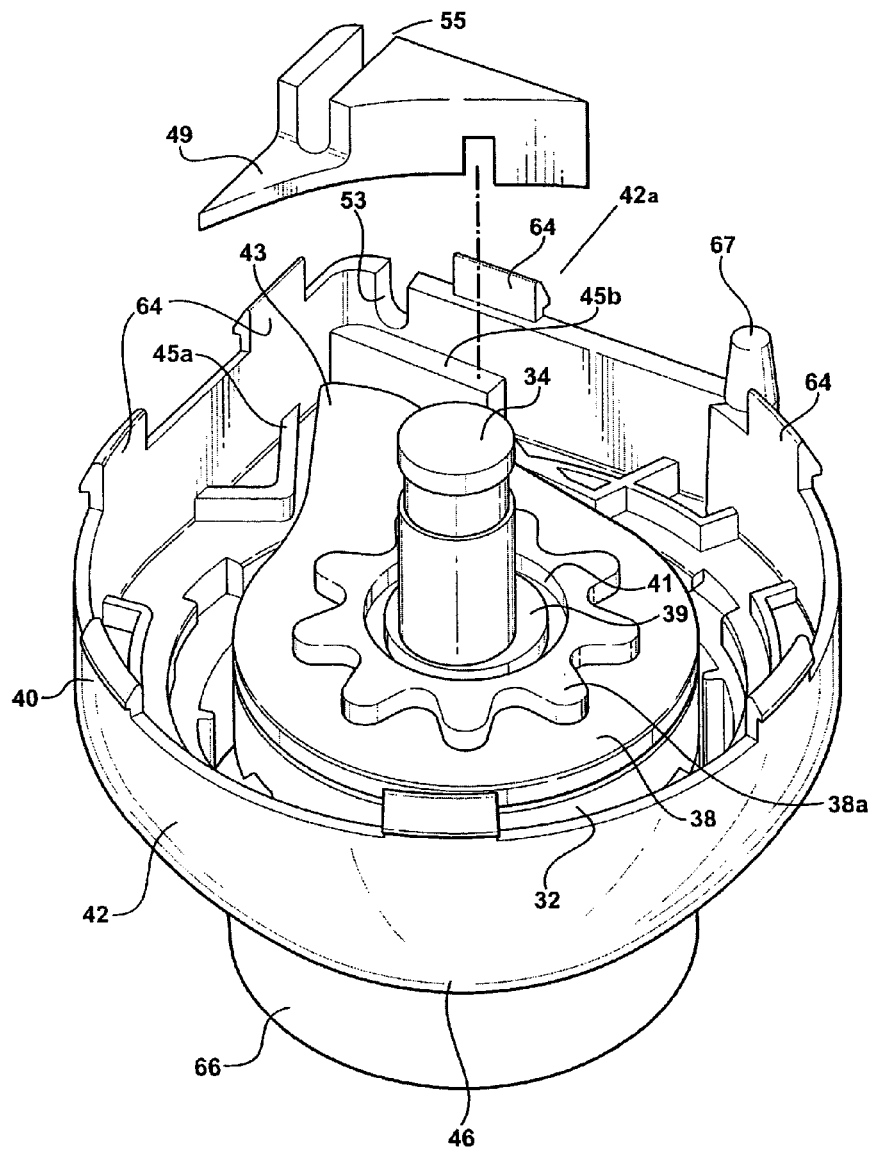
FIG. 6 is a bottom perspective view of the housing.

The gear reduction mechanism 36 includes a ring gear 37, a planetary gear or actuator 38 and an eccentric cam 39. The ring gear 37 is integrally formed or fixedly secured to the spool 26. The ring gear 37 includes a plurality of teeth. The actuator 38 includes a plurality of teeth 38a, shown in FIG. 6, for engaging the teeth of the ring gear 37. The actuator 38 has at least one less tooth than the ring gear 37, thereby defining the reducing function of the gear reduction mechanism 36. The eccentric cam 39 is fixedly secured to the shaft 24. The actuator 38 includes a center bore 41 for receiving the eccentric cam 39 therein. The cam 39 drives the actuator 38 in a reciprocating manner about the ring gear 37 in response to rotation of the shaft 24. As best shown in FIG. 6, the actuator 38 includes a step or arm 43 that remains rotatably constrained between opposing and spaced apart walls 45a, 45b defined in the housing 40. The walls 45a, 45b prevent rotation of the actuator 38 relative to the housing 40, but at the same time allow the actuator 38 to wobble about the teeth of the ring gear 37. The wobbling actuator 38 causes rotation of the spool 26 relative to the housing 40. Rotation of the spool 26 causes winding or unwinding of the cable 16 about the spool 26, thereby raising or lowering the carrier 12 between a storage position and an access position.

Figure 2:
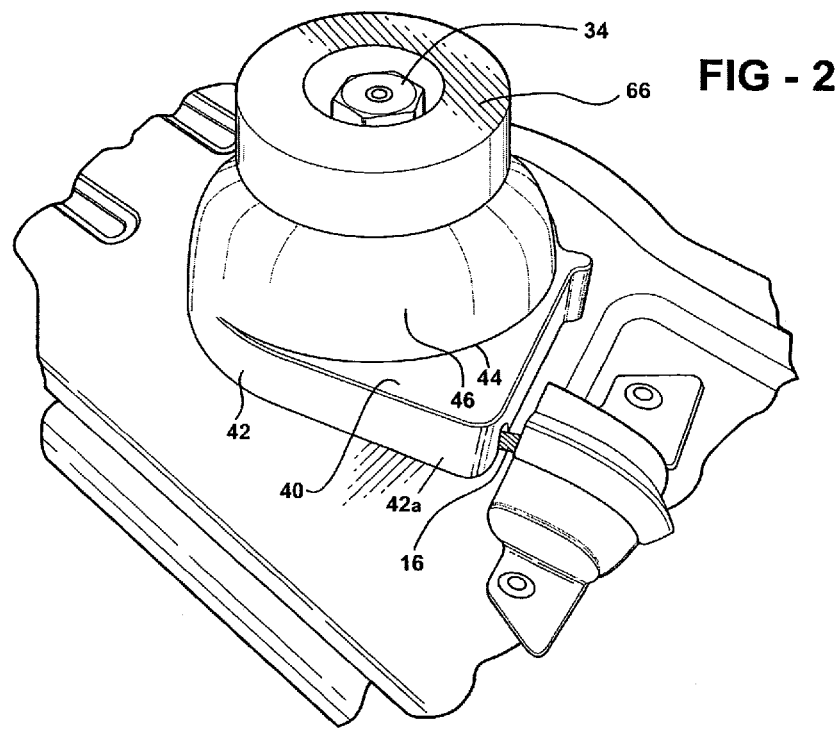
FIG. 2 is a top perspective view of a housing for a winch assembly in the tire carrying device.

As shown in FIGS. 2 and 6, the housing 40 has a side portion 42 which extends from a peripheral edge 44 of a domed portion 46. The housing 40 has an inner surface 48 defining a cavity housing the torque limiter 28 and spool 26. The side portion 42 is generally cylindrical to extend closely about the spool 26 to maintain the cable 16 on the spool 26. The side portion 42 includes a flared portion 42a. An abutment block 49 is nestingly supported in the flared portion 42a. The flared portion 42a and block 49 have corresponding slots 53, 55 through which the cable 16 exits the housing 40.

The domed portion 46 covers the torque limiter 28. The domed portion 46 has a generally flat center 50 in which a throughbore 52 is formed to receive the drive nut portion 34. Flange 54 extends inwardly from the inner surface 48 of the domed portion 46. Each flange 54 has a radially extending edge 56 formed to position an upper surface of the spool 26 and an axially extending edge 58 to position the friction plates 30, 32 of the torque limiter 28. Preferably, at least three flanges 54 extend inwardly from the inner surface 48 for locating and supporting the spool 26 and friction plate 30, 32 within the cavity of the housing 40.

A plurality of tabs 64 extends from an edge of the housing 40. The tabs 64 correspond to a plurality of slots 65 formed in the mounting plate 18. The tabs 64 have an arrowhead-shaped cross section to guide the tabs into the slots 65 in the mounting plate 18. The tabs 64 engage or snap against the edges of the mounting plate 18 defining the slots 65 to fixedly secure the housing 40 to the mounting plate 18. Preferably, the housing 40 includes seven tabs 64 for lockingly engaging as many slots 65 in mounting plate 18. Most preferably, a pin 67 extends from the edge of the housing 40 to help locate the housing 40 relative to the mounting plate 18 during assembly. The housing 40 is advantageously formed in one piece from any suitable rigid material. In the preferred embodiment, the housing is molded of glass reinforced nylon.

The mounting plate 18 includes an aperture 60 corresponding with the throughbore 52 in the flat center 50 of the domed portion 46. The throughbore 52 in the flat center 50 and the aperture 60 in the mounting plate 18 are generally aligned along a longitudinal axis 62. The throughbore 52 in the flat center 50 rotatably supports the drive nut portion 34 of the torque limiter 28. The aperture 60 in the mounting plate 40 rotatably supports the shaft 24.

It may be necessary to provide an opening in a compartment wall of the vehicle to accommodate the winch assembly 12. In that case, a cap 66 is fixedly secured to the flat center 50 of the housing 40. The cap 66 is adapted for sealing the opening to prevent exhaust gases and moisture from entering the vehicle compartment. Preferably, the cap 66 is made from foam material or other flexible materials having similar sealing properties known by those skilled in the art.

Figure 3:
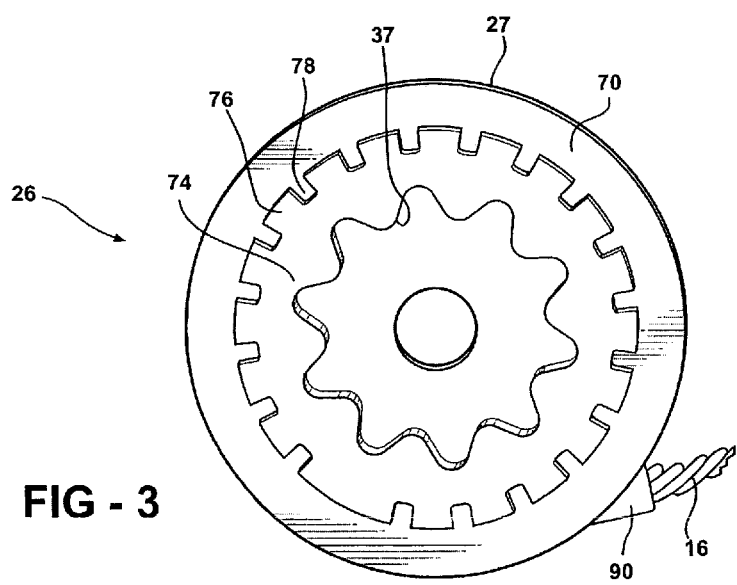
FIG. 3 is a top view of a spool in the winch assembly.
Figure 4:
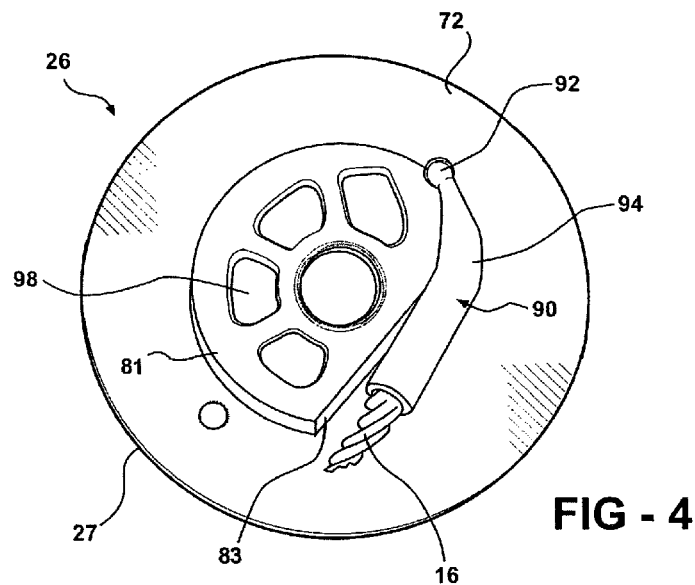
FIG. 4 is a bottom view of the spool as a tether is being assembled to it.
Figure 5:
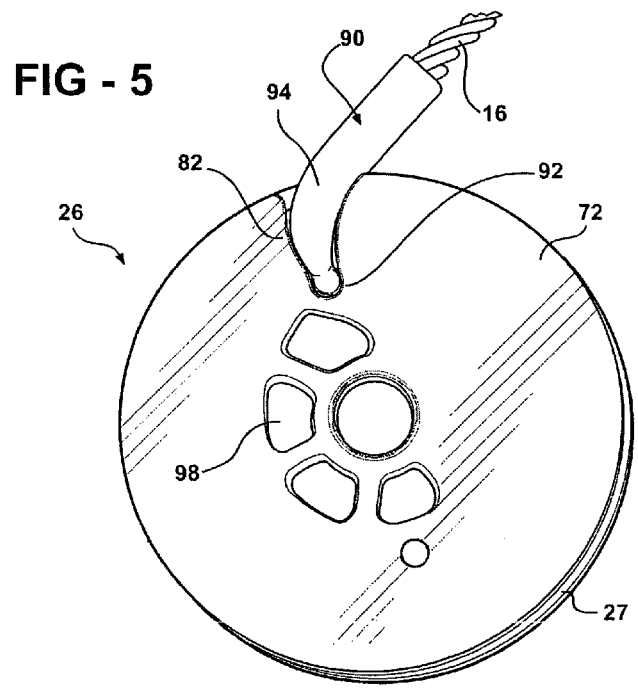
FIG. 5 is a bottom view of the spool with the tether assembled to it.

The sheave assembly or spool 26 is shown in detail in FIGS. 3–5. The spool 26 is disc-shaped and is preferably formed from plastic in an injection mold. The spool 26 includes opposite first 70 and second 72 sides. A gear ring 74 is integrally molded in the first side 70. The gear ring 74 includes an inner circumerence that defines a void for receiving a portion of the actuator 38. A circumferential surface is formed along the inner circumference of the gear ring 74. More specifically, the ring gear 37 from the gear reduction mechanism 36 described above is defined along the circumferential surface for drivingly engaging the actuator 38. The gear ring 74 also includes an outer edge. A plurality of projections 76 extends radially outwardly from the outer edge. A plurality of voids 78 are defined between adjacent pairs of projections 76. During formation of the spool 26, the gear ring 74 is suspended within a cavity in the mold. Molten plastic is injected into the mold and fills the voids 78 between the projections 76. The plastic hardens to form a holding portion that fixedly secures the gear ring 74 to the spool 26.

A generally cylindrical center 81 defines the bottom of the groove 27. The center 81 of the spool 26 includes a cut-away portion 83. A slot 82 extends generally radially inwardly from an outer edge of the second side 72 toward a center of the spool 26. The slot 82 extends through the groove 27 to accept the end fitting 90 of the cable 16. The end fitting 90 has a pin 92 which extends axially outwardly from a curved sleeve 94. The end fitting 90 is inserted into the slot 82 as shown in FIG. 5, until the pin 92 rests in the end of the slot 82. As shown in FIG. 4, the pin 92 is pivotally supported and retained at the end of the slot 82 to allow the sleeve 94 to rest against the cut-away portion 83 as the cable 16 is wound about the center 81 of the spool 26. The cable 16 extends from the sleeve 94 and exits the housing 40 through the slots 53, 55 of the flared portion 42a and block 49, as best shown in FIG. 6. The sleeve 94 abuts the block 49 to relieve stress on the interconnection between the pin 92 and the edges of the spool 26 defining the slot 82 when the cable 16 has been uncoiled from the spool 26. Block 49 also prevents winch mechanism from back-winding and provides a bumper to the sleeve from breaking through the wall of the housing. A plurality of apertures 98 are formed radially about the central portion the spool 26 to promote an even cooling of the spool 26 after formation in the injection mold.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A tire carrier assembly for use with a vehicle, said carrier assembly comprising:

a mounting plate mounted to said vehicle, said mounting plate including a plurality of apertures;

a winch mechanism mounted to said mounting plate, said winch mechanism including a spool and a torque limiter, said torque limiter axially adjacent to said spool to deliver torque when said spool is turned and to limit the minimum amount of torque delivered to said spool;

a cable having one end attached to said spool and having a tire carrier attached to an opposite end; and a housing having a plurality of tabs releasably engaging said plurality of apertures to mount said housing to said mounting plate, said housing having an inner surface defining a single cavity for substantially enclosing both said spool and said torque limiter therein, said housing having at least one flange extending inwardly from said inner surface for positioning said torque limiter and said spool within said cavity.

2. A carrier assembly as set forth in claim 1, wherein said flange of said housing includes a radially extending edge for positioning said spool within said cavity.

3. A carrier assembly as set forth in claim 2, wherein said flange of said housing includes an axially extending edge to position said torque limiter within said cavity.

4. A carrier assembly as set forth in claim 3, wherein said housing includes a substantially flat center, said flat center having a bore formed therethrough.

5. A carrier assembly as set forth in claim 4, wherein said housing is molded in one piece from a moldable material.

6. A carrier assembly as set forth in claim 5, wherein said moldable material is glass reinforced nylon.

7. A carrier assembly as set forth in claim 1, wherein said torque limiter includes an upper plate having a drive nut portion, said drive nut portion being adapted to interconnect with a crank handle to facilitate manual actuation of said carrier assembly.

8. A carrier assembly as set forth in claim 7, wherein said torque limiter includes a lower plate axially engaged with said upper plate for transferring torque between said upper plate and said spool.

9. A carrier assembly as set forth in claim 8 including a biasing member for continuously biasing said upper and lower plates toward each other to allow torque to be transferred between said upper plate and said lower plate, said biasing member having a predetermined spring rate to allow said upper and lower plates to slip to prevent overloading of said cable.

10. A carrier assembly as set forth in claim 1 including a gear reduction mechanism operatively coupled between said lower plate and said spool.

11. A carrier assembly as set forth in claim 10, wherein said gear reduction mechanism includes a ring gear integrally formed with said spool.

12. A spool for use in a winch assembly, the winch assembly including a drive mechanism, and a cable having end fitting, said spool comprising:
　　a body having a notch for receiving the end fitting of the cable, said body further having a circumferential groove to receive said cable when said winch is being wound to coil said cable; and
　　a gear ring integrally molded into said body, said gear having a circumferential surface, said body forming a void adjacent said circumferential surface adapted to receive a portion of the drive mechanism, said circumferential surface being operably connected to the drive mechanism, said gear ring having a plurality of projections extending radially from an outer edge thereof, wherein a plurality of voids are each defined between adjacent pairs of said plurality of projections, said voids being filled with moldable material during formation of said spool such that said spool is integrally formed with said spool when said moldable material has hardened.

13. A spool as set forth in claim 12 wherein said circumferential surface is along an inner circumference of said gear ring.

14. A spool as set forth in claim 12, wherein said circumferential surface defines a ring gear.

\* \* \* \* \*